United States Patent
Harris et al.

(10) Patent No.: US 6,404,413 B1
(45) Date of Patent: Jun. 11, 2002

(54) ELECTROSTATIC CHROMATOPHORIC DISPLAY

(76) Inventors: Ellis D. Harris, 1646 Lynoak Dr., Claremont, CA (US) 91711; Scott M. Stratford, 9746 Whirlaway, Alta Loma, CA (US) 91737

(*) Notice: Subject to any disclaimer, the term of this patent is extended or adjusted under 35 U.S.C. 154(b) by 0 days.

(21) Appl. No.: 09/637,159

(22) Filed: Aug. 14, 2000

(51) Int. Cl.$^7$ ............................ G09G 3/34; G02B 26/02
(52) U.S. Cl. ......................... 345/85; 345/108; 359/230
(58) Field of Search .......................... 345/84, 85, 108; 340/815.62; 359/223, 224, 225, 226, 227, 230, 231, 234

(56) References Cited

U.S. PATENT DOCUMENTS

| | | | | |
|---|---|---|---|---|
| 4,160,582 A | * | 7/1979 | Yasuo | 359/230 |
| 4,736,202 A | * | 4/1988 | Simpson et al. | 345/85 |
| 4,794,370 A | * | 12/1988 | Simpson et al. | 345/85 |
| 5,943,033 A | * | 8/1999 | Sugahara et al. | 345/85 |
| 6,057,814 A | * | 5/2000 | Kalt | 345/85 |
| 6,081,249 A | * | 6/2000 | Harris | 345/85 |
| 6,130,656 A | * | 10/2000 | Sugahara | 345/85 |
| 6,198,512 B1 | * | 3/2001 | Harris | 348/603 |
| 6,239,777 B1 | * | 5/2001 | Sugahara et al. | 345/85 |

* cited by examiner

Primary Examiner—Steven Saras
Assistant Examiner—Paul Bell

(57) ABSTRACT

A display mechanism is described having the capability of showing two or more colors using one or more flexible membranes that electrostatically switch positions between stationary electrodes of different geometry and color. Each flexible colored membrane is multi-layered and comprised of at least one conductive layer and one dielectric layer. Each membrane or stack of membranes with the adjacent electrodes serves as a single chromatophore, the color of which is altered electrically. A first colored electrode is substantially flat and parallel to a base substrate containing control circuitry. Each of a plurality of second electrodes is of a substantially rounded geometry, around which membranes wrap as determined by electronic signal. Display color is produced as electric forces separate surfaces of common color. The display is non-luminous, consumes very little power and is easily visible under normal to very bright ambient illumination. Integrated electronics provide power, signal and connectivity. A plurality of membrane sandwiches is integrated with electronics and comprises chromatophores of the display. Display control is accomplished by a chain of CMOS inverters dynamically reconfigured into a pair of sub-chains along which signals propagate in opposite directions starting from the point of initial membrane separation and ending at the point of final separation. Propagation delay enables membranes being switched between electrodes to switch separately minimizing required drive forces. Input color signal for each display chromatophore determines the sub-chain configuration that establishes element color.

16 Claims, 14 Drawing Sheets

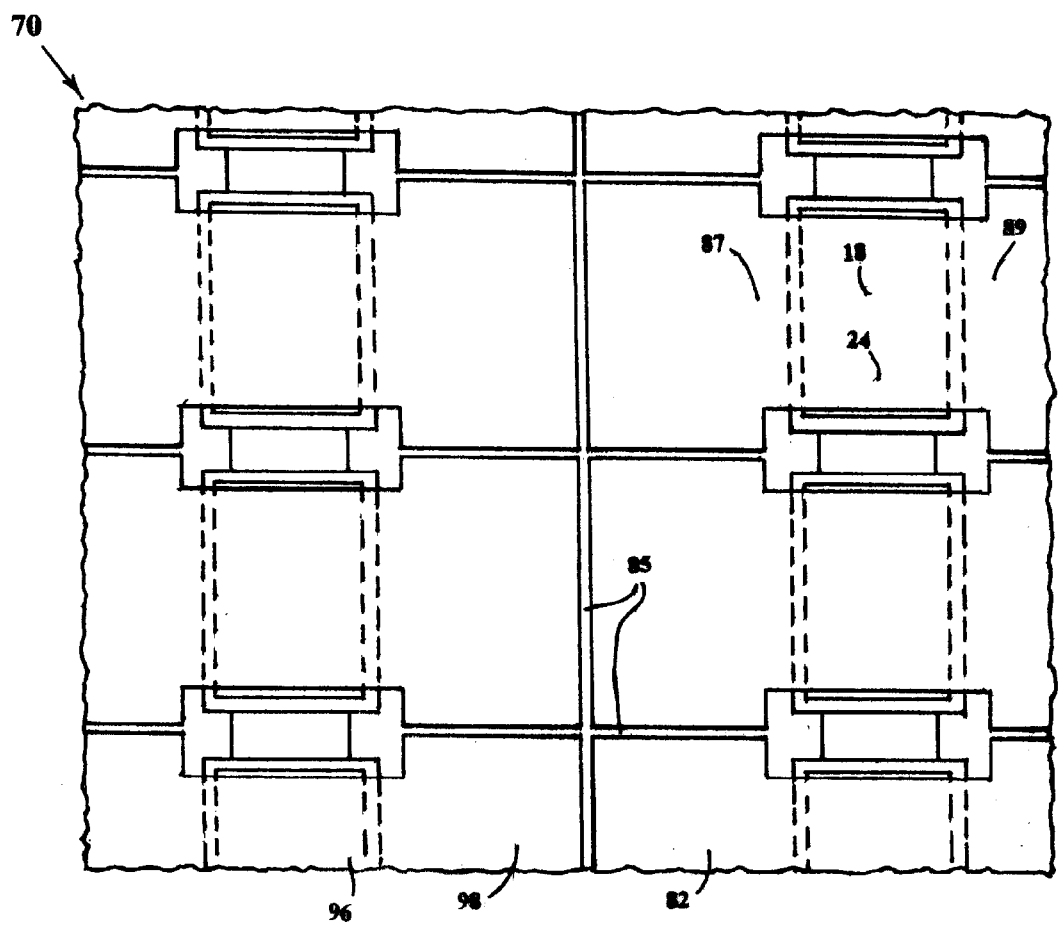
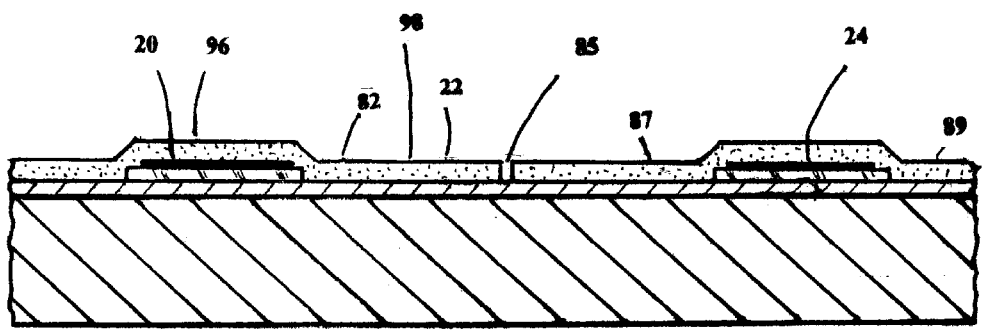
FIGURE 4

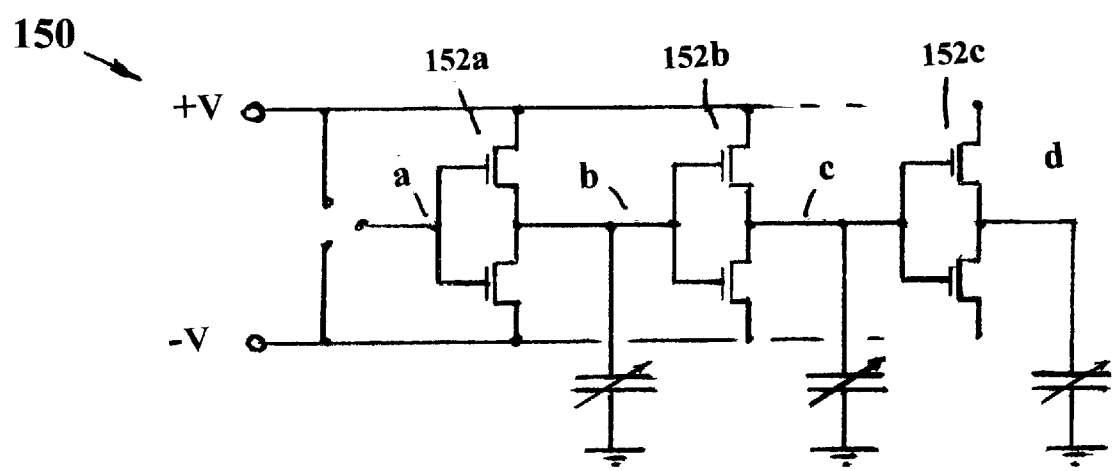
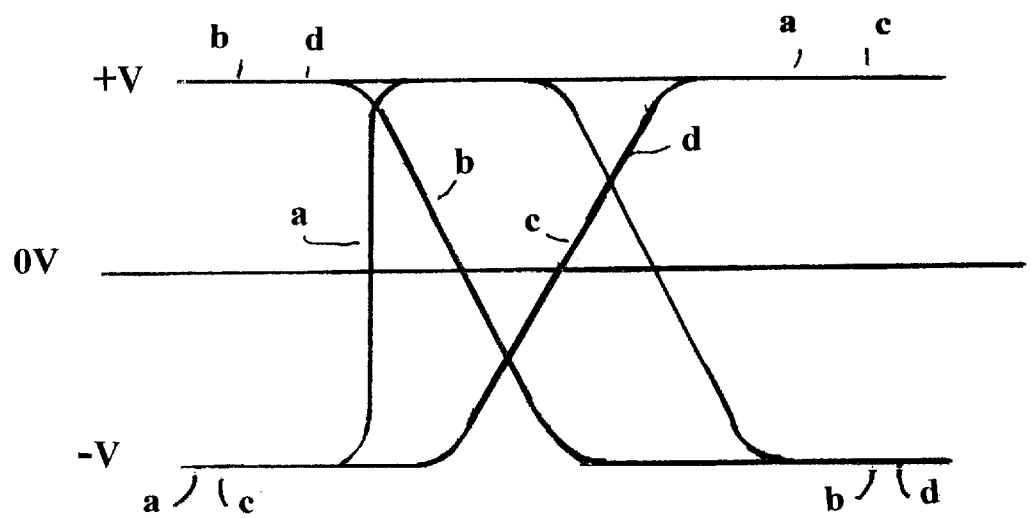
FIGURE 10

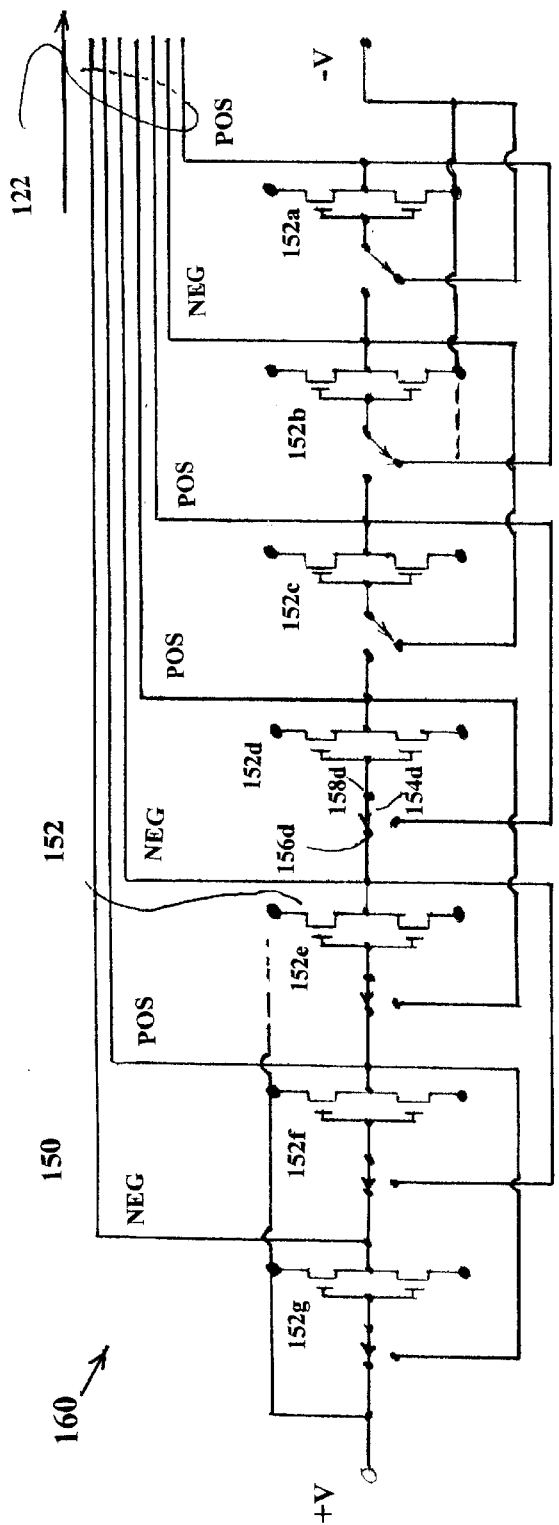
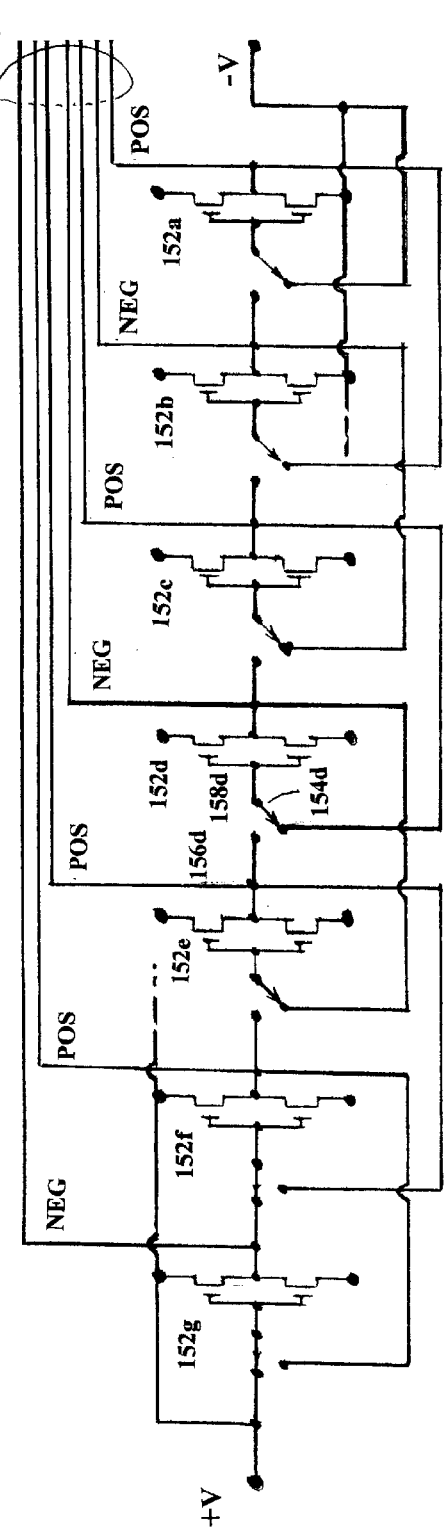
FIGURE 11A
FIGURE 11B

ELECTROSTATIC CHROMATOPHORIC DISPLAY

BACKGROUND OF THE INVENTION

1. Field of the Invention

This invention relates to an electrostatic display device and more particularly a chromatophore display mechanism, improved display control circuitry and cost effective methods for display production.

2. Discussion of Prior Art

Display devices based upon electrostatic attraction of a thin, insulated dielectric membrane have been disclosed in a number of prior art patents including: U.S. Pat. Nos. 3,897, 997; 4,094,590; 4,105,294; 4,160,582; 4,229,075; 4,336, 536; 4,468,663; 4,747,670; 4,831,371; 4,891,635; and 5,667,784. Generally these prior art devices require fabrication by assembling small mechanical parts, the very nature of which precludes cost-effective production of displays having the number of pixels typical of many display applications.

This invention bears a relation to three prior inventions by one of the inventors, Ellis D. Harris. U.S. Pat. No. 6,081,249 "WRAP AROUND MEMBRANE COLOR DISPLAY DEVICE" describes an assembly of filament electrodes, membrane sandwiches and silicon electronics to achieve a chromatophore color display. A second patent U.S. Pat. No. 6,127,725 'THIN INSULATOR ON METAL', describes patches of silicon-on-insulator-on foil has been allowed by the U.S. Patent Office and its issue is pending. The present inventive display device utilizes features of these two inventions. The third patent bearing relation to the current disclosure is U.S. Pat. No. 6,198,512 'METHOD FOR COLOR IN CHROMATOPHORE DISPLAYS' and describes means to transform television color signal into a form useful in a chromatophore display including a display of the type of the present invention. These above three patents are included herein by reference.

Chromatophore is the term used to designate selectable pigment elements to provide color selectivity with only ambient illumination. The classical example is the color variation in certain animals, notably a chameleon, wherein changes of color are effected by means of pigment-bearing sacs. By analogy a chromatophoric display is defined as a display wherein non self-luminous picture elements change color under electronic control and are viewable under ambient illumination.

A first primary benefit of a chromatophore display is that the amount of power consumed is many times less than that required by current display technologies. This is especially significant for portable display devices wherein power must be supplied by a battery pack. The lower power consumption is the result of three inherent technical advantages of chromatophoric displays: 1) No power is required for transmissive illumination; 2) Each pixel does not require constant drive power to show a desired color—drive power is only consumed in the instant when the color is changed; and 3) Only a fraction of the pixels are consuming drive power at any given time. An example of the last benefit would be a display used for a word processor where the only pixels requiring power are those forming the new letters as they are entered on the keyboard while the rest of the pixels remain unchanged.

A second primary benefit is that the display is viewable under very bright conditions, such as direct sunlight. The utilization of CRT, LCD or other self-luminous displays is often disappointing in bright ambient light environments because there is insufficient transmissive display illumination to create enough contrast for easy viewing. By comparison, an outdoor sign such as a billboard is highly visible in bright sunlight. A chromatophoric display combines aspects of a painting hanging on a wall or an outdoor sign viewed in reflected light with the moving features of cinema or television. Like a picture on a wall it utilizes and requires ambient illumination for viewing. Although low ambient illumination conditions may require auxiliary illumination, such auxiliary illumination need not be generated by the display itself Supplying such illumination by external means will be cost-effective relative to supplying the power needs of a self-luminous display.

A third primary benefit is that the display can be made very thin, light and flexible for many applications not possible with display technologies requiring rigid glass components.

A fourth primary benefit of chromatophoric displays is the absence of flicker which is known to induce psychosomatic distress in some individuals. Flicker is common in displays that rely on a phosphor since the phosphor for any given pixel is stimulated only once for each frame and the luminosity decays over the rest of the frame. In cinema, flicker results from the limited fraction of time that the film gate is open during a frame time. A cinema frame is mostly all on when the film gate is open and mostly all off when the film gate is closed. By contrast in a chromatophoric display, once a chromatophore color is set it remains constant and unchanged until the image requirements require a different color. Pixel brightness of a chromatophoric display does not decay during the frame time as in the case of the phosphor on a CRT display. At no time is the frame completely Black, as is the case between frames in cinema. As a consequence there is no perceivable flicker in a chromatophoric display.

A fifth primary benefit of a chromatophoric display is the ability to easily retain images. Since the flexible membrane of a chromatophore element will still retain its position when the drive signal is removed, this enables the inventive display device to hold an image for a period of time after disconnection from electronic display drivers. Display retention can be extended indefinitely with the inclusion of holding electronics including a minimum battery voltage supply. The retained display may later be recovered by connecting the display to source of electric power and synchronization.

The present inventive display device describes an innovative chromatophore geometry that makes it possible to produce high resolution displays in high volumes and cost effectively. The chromatophore geometry, display control circuitry and production methodology are applicable for both monochrome and color devices—Beneficial features are inherent in both. Innovative display technologies have invariably developed first in monochromatic form and color technology has subsequently followed. When color has been available it has been preferred, both for esthetics and for the additional information that can be conveyed.

Where self-luminous displays are commonly characterized in terms of luminosity, chromatophoric displays must be characterized in terms of brightness. For the presentation of color images the inventive chromatophoric display device has the inherent capability for all pixels in any localized area to be any of the bright primary colors, Cyan, Magenta, and Yellow. This capability allows the display of highlight colors in maximum brightness. The darker primary colors of Red, Green and Blue may also be made available along with Black and White. With these eight colors many hues and chromas can be made available and human perception of color in a chromatophoric display can approximate the color resolution used extensively in multicolor printed images today.

Coloring of the chromatophores can be accomplished using ink and pigment technologies in various forms that are well known and in an advanced state of development. Pigment particle size can average 0.04 microns, with often a maximum of 0.2 microns. Colored transmissivity is optimum for the smaller particle sizes. A well-known approach to enhance color is to include fluorescence in the pigment formulation. In a typical approach a fluorescing dye is included that absorbs light in the UV and produces a fluorescence that adds to the passive pigment color.

A display device can be formed using an array of chromatophore mechanisms or elements. An array is commonly perceived in terms of rows and columns. For purposes of this present invention a more general definition is used wherein an array is considered as a grouping of elements in a general sense, including rectangular, hexagonal, circular and arbitrary arrangements of elements.

The chromatophore display can utilize electronics for image control. Transistor electronics are in a high state of development. Many hundred of thousands of transistors together with interconnectivity means are commonly fabricated on a single substrate. It is well known that transistors can be fabricated that operate at a wide range of specific voltage levels, including from only a few volts up to many tens of volts. Electronics can thus be achieved for an extended variety of chromatophore displays.

In accordance with the present invention a possible electronics module for the display comprises a substrate coated with an appropriate insulator film that in turn is coated with a film of semiconductor within which thin film transistor electronics circuits are further generated along with interconnection means. By these means islands of thin film electronics-on-insulator on a thin film substrate are achieved. Thinness, flexibility and low cost are enabled. The thin film format enables picture on the wall television as well as a computer or television displays that emulate pages of a book. In one approach particulate matter is deposited onto a substrate in a desired pattern of isolated patches by a printing or lithographic process and then fused into patches of smooth thin film. Insulator particles are first deposited onto the substrate and then fused into patches of smooth insulator film adhered to the substrate. Semiconductor particles are next deposited on the patches of insulator film and processed into electronic quality semiconductor film. This is the approach described by our patent U.S. Pat. No. 6,127,725 "THIN FILM ELECTRONICS ON INSULATOR ON METAL. The semiconductor can be any of the commonly known semiconductor material, including: silicon, germanium, gallium-arsenide or one of a number of organic semiconductor materials. TFT electronics are next generated in the semiconductor by well-known means. By this means a plurality of individual circuits are disposed in isolated patches over the extent of the chromatophore display. In subsequent steps these electronic circuit patches are interconnected and also integrated with stacks of membranes having specific optical characteristics, which then comprise the chromatophores of the display.

Utilization of thin film structures provides an inherent mechanical flexibility. The thin film assembly can be mounted by any of a number of optional methods. It could be stretched over a frame, affixed to a flat substrate, or mounted such as to be rolled up and let down typical of screens used in projection displays. Other alternate mounting means include binding one or more thin film assemblies similar to pages in a book.

The innovative chromatophore geometry of the inventive device makes it possible to use precision printing technology as the primary production process to manufacture displays instead of the complicated mechanical assembly required in previous electrostatic displays. The control circuitry, electrodes and flexible membranes of the chromatophores can be created, placed and connected through multiple printing operations. The inventive display device utilizes knowledge commonly used in printing technologies. Techniques of printing and lithography, including photolithography and microlithography are well known, having undergone technical development and improvement for decades and even centuries. Processes and materials for the utilization of photo-resists, etchants, masks, optics, pigments and inks are in a high state of development and are in common usage in industry. It is an object of this invention to utilize such techniques in fabrication of the display as a primary means to achieve low cost.

Fabrication of the chromatophore structure may be enhanced through the use of photoresist material as a temporary layer that is removed in subsequent production steps. Photoresists, as utilized in the microelectronics industry, are commonly comprised of a polymer containing an optically active additive chemical. The photoresist can be either positive of negative depending upon the action of light upon the additive. Positive resists are rendered soluble by exposure to illumination while negative resists are soluble except when rendered insoluble by exposure. A novel approach in the fabrication of the inventive display mechanism utilizes a photo resist into which two additives have been introduced. A polymer containing the two additives is formed into a desired shape and rendered insoluble by an initial exposure to a first optical wavelength that acts upon the first additive. In a later step patterning is achieved by optical activation of the second additive with a second optical wavelength followed by an etch step.

Another novel approach for fabrication of thin film sandwiches for application in the inventive mechanism incorporates features of both extrusion and casting. A mold for casting a patterned thin film is comprised of two mold halves that rotate together and an extrusion orifice through which the molded films emerge. As the film immerges it is sufficiently viscous to hold its shape temporarily. Immediately upon emerging from the orifice optical flux hardens the film.

The extrusion/casting process requires highly precise production tooling that will be manufactured with diamond turning. Diamond turning of metal is a process initially developed by the military to produce very smooth metal surfaces. The process has been utilized in the fabrication of precision metal optics. In diamond turned metal surfaces the cutting can be so fine that the surface crystal structure is undisturbed. Experiments have shown that because of lack of surface crystal disruptions a diamond turned copper surface can remain in moist air for months without losing its brightness. With careful temperature control and with steps taken to avoid mechanical disturbances, including even normal laboratory conversation, surface features can be held to within a few atomic diameters. When diamond turned tools are utilized in high volume production the high cost of the tooling will generate a minimum contribution to unit cost. With the utilization of diamond turned for mold/cast tooling, mold halves that rotate together can generate the a needed pattern for extrusion while remaining sufficiently tight where they meet on the ends as to confine the mold material. On each complete rotation of the two-piece rotary mold, a patterned thin film for one production display mechanism will be produced. Additional patterning and integration with other components will be performed in succeeding steps.

In one preferred approach a production line will comprise a plurality of mold/cast tools for the production of arrays of stacks of membrane sandwiches along with other tooling for the production of electronics modules and their integration. In other preferred approaches production tooling will be comprised of means for printing and photo-etching.

It is an object of this invention to provide an innovative chromatophoric element geometry that makes it possible to cost-effectively produce chromatophore display devices that utilize voltage positionable membranes.

It is an additional object of this invention to provide a display that is viewable in high ambient light conditions, such as bright sunlight.

It is an object of this invention to provide electrically activated chromatophores for a display device wherein each chromatophore is capable of assuming any of a selected set of colors.

It is another object of this invention to provide a high resolution, high brightness color display device wherein neither display self-luminance nor a dedicated illumination source is required, but wherein the display is viewed under ambient illumination.

It is a further object of this invention to provide a color display device wherein bright color highlights of natural objects in ambient illumination can be displayed.

It is an object of this invention to provide chromatophore flexible membranes, that have enhanced separation capabilities, flexure performance and minimized surface contact.

It is an object of this invention to provide a color chromatophore display device using an assembly of stacks of voltage positionable colored membranes whereby each chromatophore color is selectable from a palette of primary colors and wherein all chromatophores of the display are optionally able to assume any color of the primary color palette.

It is a further object of this invention to provide a color display device in thin format wherein a printed page is emulated.

It is an additional object of this invention to an optical image display device in a thin flexible format.

It is an additional object of this invention to enable "Picture on the Wall" television.

It is another object of this invention to provide means whereby membranes of a stack of voltage positionable membranes are positioned separately whereby mechanical forces needed are minimized.

It is yet another object of this invention to minimize the electrical drive power consumed by a color display device through control circuitry that changes only those chromatophores that need to be changed while all other chromatophores remain unchanged.

It is yet another object of this invention to provide a color display device upon which imaginal data is displayable at frame rates compatible with typical television and/or computer displays.

It is yet another object of this invention to provide a non-luminous color display whereby battery requirements for portable equipment is minimal.

It is yet another object of this invention to provide a color display device that maintains the display of a color image when the display device is disconnected from sources of power.

It is a further object of this invention to allow a stored image display to be recovered as a data stream by reconnecting the display device to sources of power and synchronization.

Other objects and attainments, together with a fuller understanding of the invention will become apparent and appreciated by referring to the following description and claims taken in conjunction with the accompanying drawings.

SUMMARY OF THE INVENTION

A display mechanism is described having the capability of showing two or more colors using one or more flexible membranes that electrostatically switch positions between stationary electrodes of different geometry and color. Each flexible colored membrane is multi-layered and comprised of at least one conductive layer and one dielectric layer. Each membrane or stack of membranes with the adjacent electrodes serves as a single chromatophore, the color of which is altered electrically. A first colored electrode is substantially flat and parallel to a base substrate containing control circuitry. Each of a plurality of second electrodes is of a substantially rounded geometry, around which membranes wrap as determined by electronic signal. Display color is produced as electric forces separate surfaces of common color. The display is non-luminous, consumes very little power and is easily visible under normal to very bright ambient illumination. Integrated electronics provide power, signal and connectivity. A plurality of membrane sandwiches is integrated with electronics and comprises chromatophores of the display. Display control is accomplished by a chain of CMOS inverters dynamically reconfigured into a pair of sub-chains along which signals propagate in opposite directions starting from the point of initial membrane separation and ending at the point of final separation. Propagation delay enables membranes being switched between electrodes to switch separately minimizing required drive forces. Input color signal for each display chromatophore determines the sub-chain configuration that establishes element color.

BRIEF DESCRIPTION OF THE DRAWINGS

FIG. 4 shows a membrane sandwich assembly fabricated by printing means integrated with an electronics subassembly.

FIG. 10 illustrates electronic delay as signal is propagated along a chain of CMOS inverters.

FIG. 11A and 11B illustrate two configurations of a chain of CMOS inverters utilizing electronic switches to partition the chain into a pair of sub chains for driving chromatophore membranes in a ripple fashion.

DESCRIPTION OF A PREFERRED EMBODIMENTS

Figure 1:
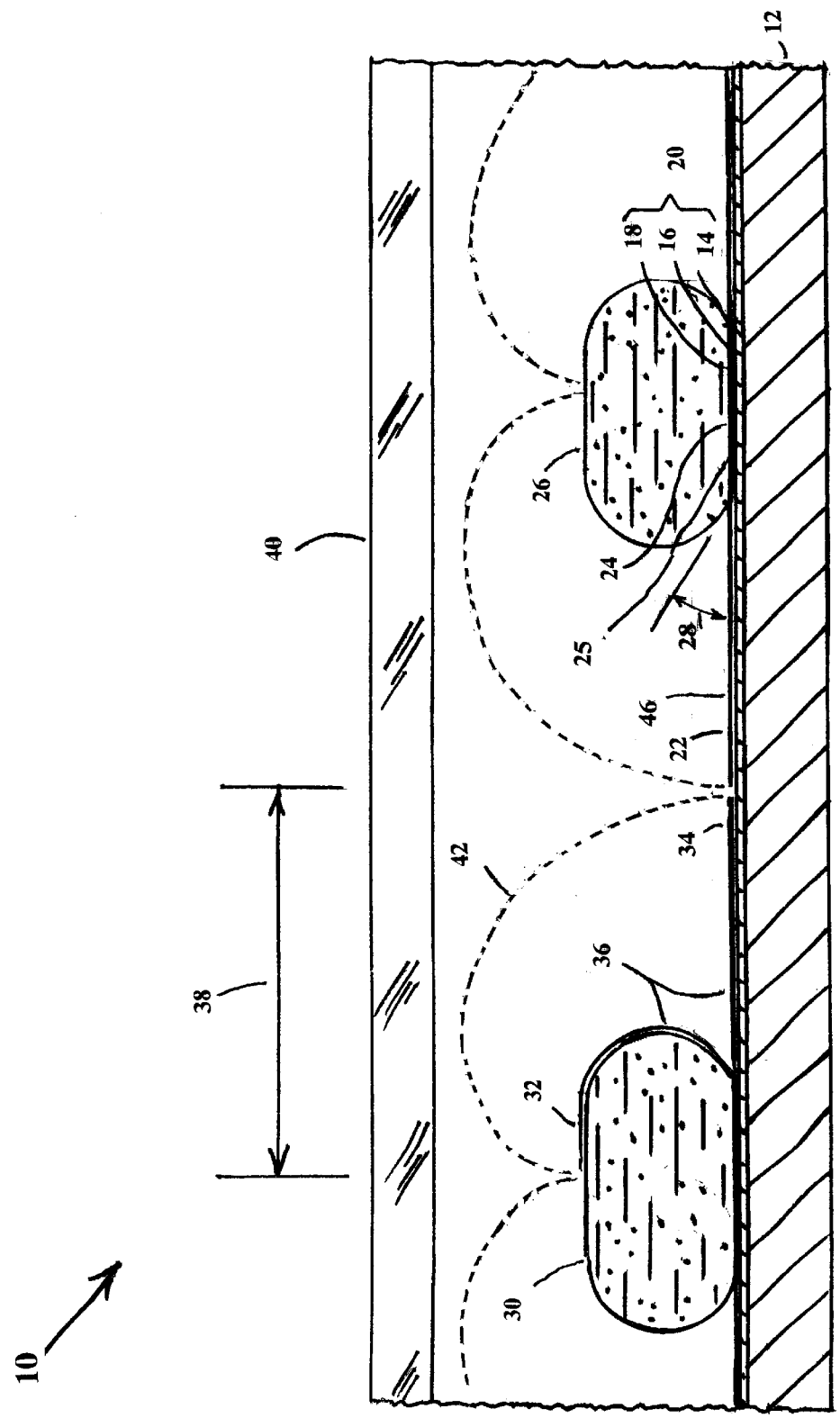
FIG. 1 presents a cross-section view of chromatophore elements and the geometry thereof.

Reference is now made to FIG. 1, wherein is illustrated a cross-section view 10 of chromatophore elements 38 of a display device in accordance with the present invention. In FIG. 1 the display mechanism is shown attached to a substrate 12 which contains thin film electronic subassembly 20. This electronic subassembly 20 includes control circuitry 18 for switching the polarity of the flexible membranes 46, electrical connectivity means 24 to attach flexible membranes 46 to electronic circuitry 18, an insulator 16 and stationary flat electrode(s) 14 that cover approximately the same area as the flexible membranes 46 when said membranes are in the flat or horizontal position. The exposed face of the stationary flat electrode 14 is the same color as the surface of the flexible membrane 46 which is immediately facing electrode 14. Each membrane 46 is comprised of multiple layers, not illustrated in FIG. 1, wherein at least one layer is conductive and at least one outer layer is dielectric and the two outer layers are different colors. A rounded and substantially three-dimensional electrode 26 is centered longitudinally on top of the attached base 25 of the flexible membranes 46 and the electrode 26 is the same color as the surface of the flexible membrane 46 that is immediately facing the surface of electrode 26. In a preferred configuration rounded three-dimensional electrode 26 and flat electrode 14 intersect at an acute angle 28. The existence of acute angle 28 is an aid in performance and generally the more acute angle is desired.

With just one flexible membrane the device is capable of displaying two colors (i.e. black and white). By reversing the polarity of the single flexible membrane it is possible to switch the position of coadunance from one electrode to the other. A plurality of colored membranes 46 can be placed on top of each other in a stack 22 to provide multicolor display capabilities. In the finished mechanism each stack 22 will provide multicolor display capability for one chromatophore. For the case of eight colors there will be seven membranes 46 in stack 22, the two electrodes will be at opposite polarities and for further explanatory purposes one electrode will be White and the other Black.

In multicolor operation, surfaces of membranes 46 and surfaces of electrodes 26 and 14 divide into two portions, 32 and 34. A first portion 32 is attracted by electric forces to each other and to rounded electrode 26 and becomes coadunate with electrode 26. The second portion 34 is similarly attracted to one another and to flat electrode 14 and becomes coadunate with flat electrode 14. Rounded electrode 26 and flat electrode 14 are each charged to a voltage potential and serve as fixed electrodes between which membrane stacks 22 are juxtapositioned. At the surfaces of separation a common color 36 is presented to view and comprises the output color of one chromatophore 38 of the display device. A transparent cover 40 provides physical protection and is spaced from the path 42 of moving membranes 32 to allow freedom of motion. This same cover 40 could also serve as an airtight seal for the display device in which a vacuum could be formed to further assist the free movement of membranes 46.

Figure 2:
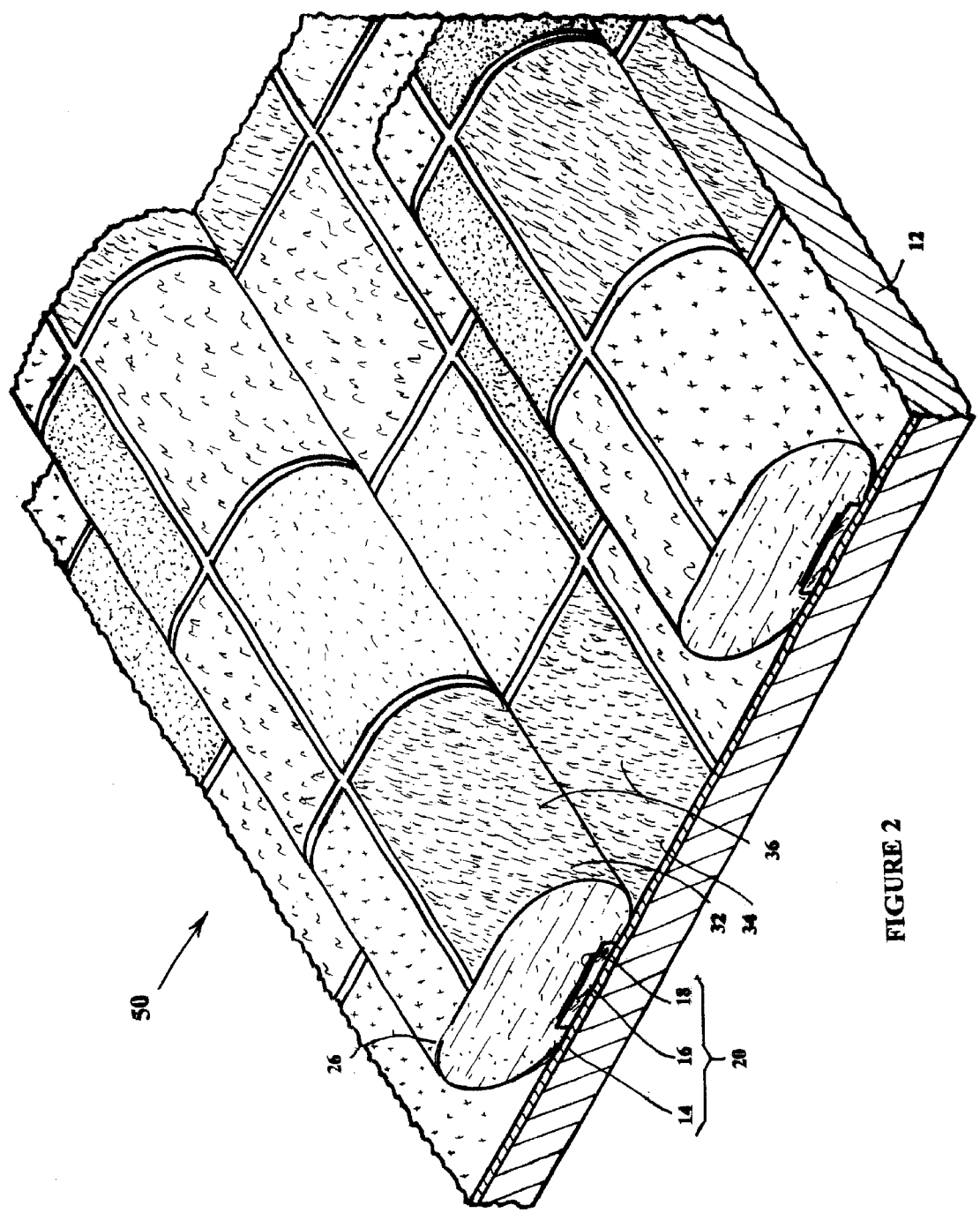
FIG. 2 is a perspective view of a representative device using an array of chromatophore elements in a multicolor display.

FIG. 2 presents a perspective view 50 of a portion of the inventive chromatophore display mechanism. A variety of surface textures 36 are shown in the figure to represent various colors being displayed.

Figure 3:
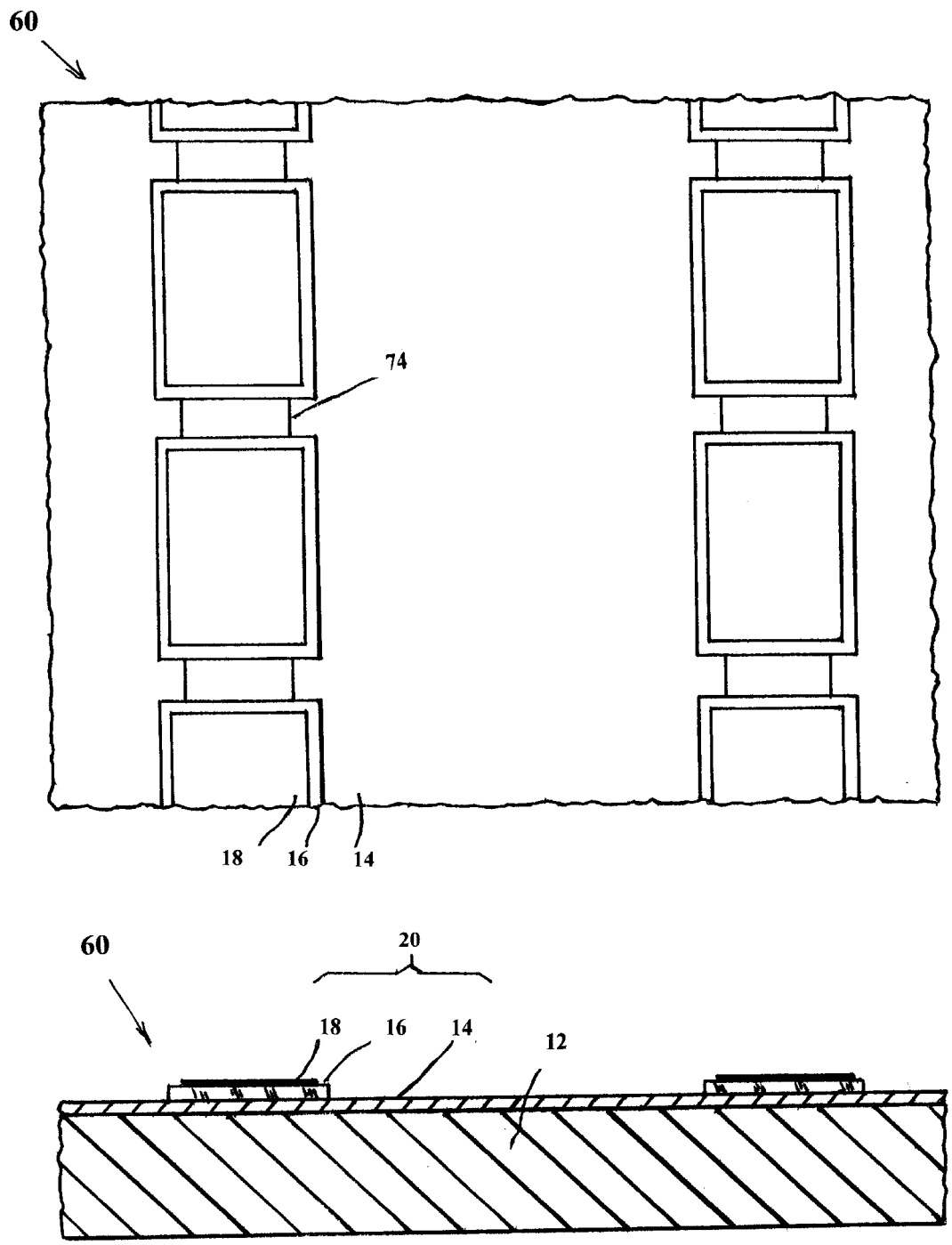
FIG. 3 illustrates an array of islands of thin film semiconductor electronics on thin film insulator.

Reference is now made to FIG. 3 wherein is illustrated a rectangular array 60 of thin film patches of semiconductor-on-insulator, 18 & 16, on metal foil 14. This array comprises a electronic subassembly 20. In the inventive display mechanism a support membrane 12 may support subassembly 20. Each patch of semiconductor 18 will preferably provide electronic input to a pair of chromatophores, one on either side of a rounded electrode 26.

FIG. 4 illustrates the results 70 of fabrication by multiple printing steps. A multi-layer coating 82 is placed and patterned over electronics subassembly 20. As the coatings that comprise multi-layer coating 82 are developed they are patterned for subdivision into membrane stacks 22, each of which become an active element in a chromatophore. Separations 85 outline stacks 22. A pair of chromatophore stacks 87 and 89 is, preferably, connected to each electronics patch 18 by connectivity means 24 included in coating 82. However, although the pair of chromatophore 87 and 89 can have common nonconductive layers in the multi-layer coating 82, there is a well-defined separation of the conductive layers of chromatophore stacks 87 and 89. Thus each electronics patch 18 provides drive signal for a pair of chromatophores 87 and 89, one on either side of a patch 18 and a rounded electrode 26, not shown. The patterning of multi-layer coating 82 includes it being partitioned into portions 96 that serve as a mechanical anchor for membranes of stack 22 and that also serves to facilitate connectivity. Other portions 98 will comprise the stack 22 of membranes 46 that are the active elements of the inventive display.

Figure 5:
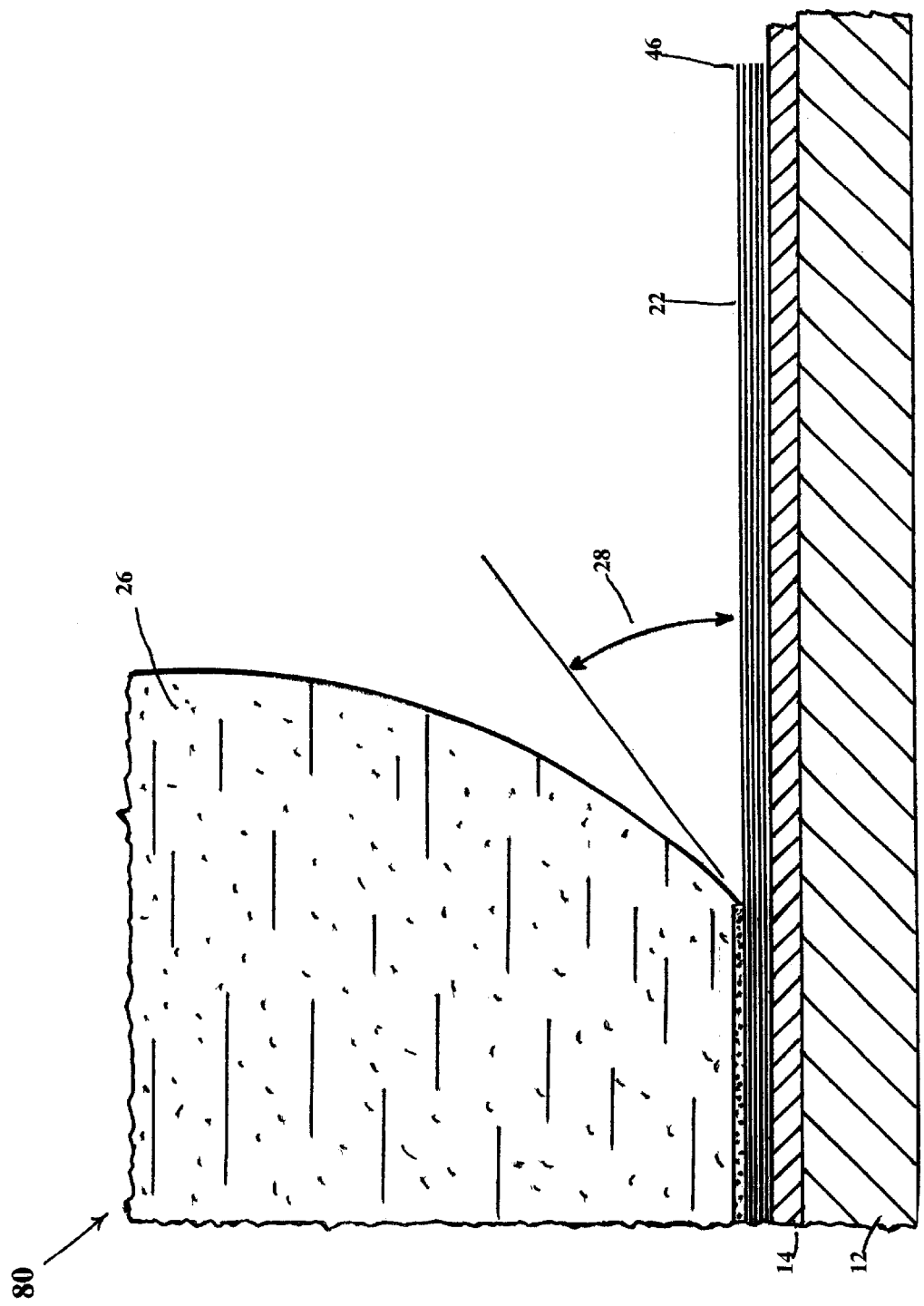
FIG. 5 presents a desirable angular relationship between membranes and electrodes.

FIG. 5 is an illustration 80 of the preferred integration of membrane 46 with rounded electrodes 26 and the flat electrode 14. Analysis indicates that electric force of attraction is greatest when two charged surfaces of opposite polarity are nearest each other and that proximity is enhanced when membranes and electrodes intersect at an acute angle 28.

Figure 6:
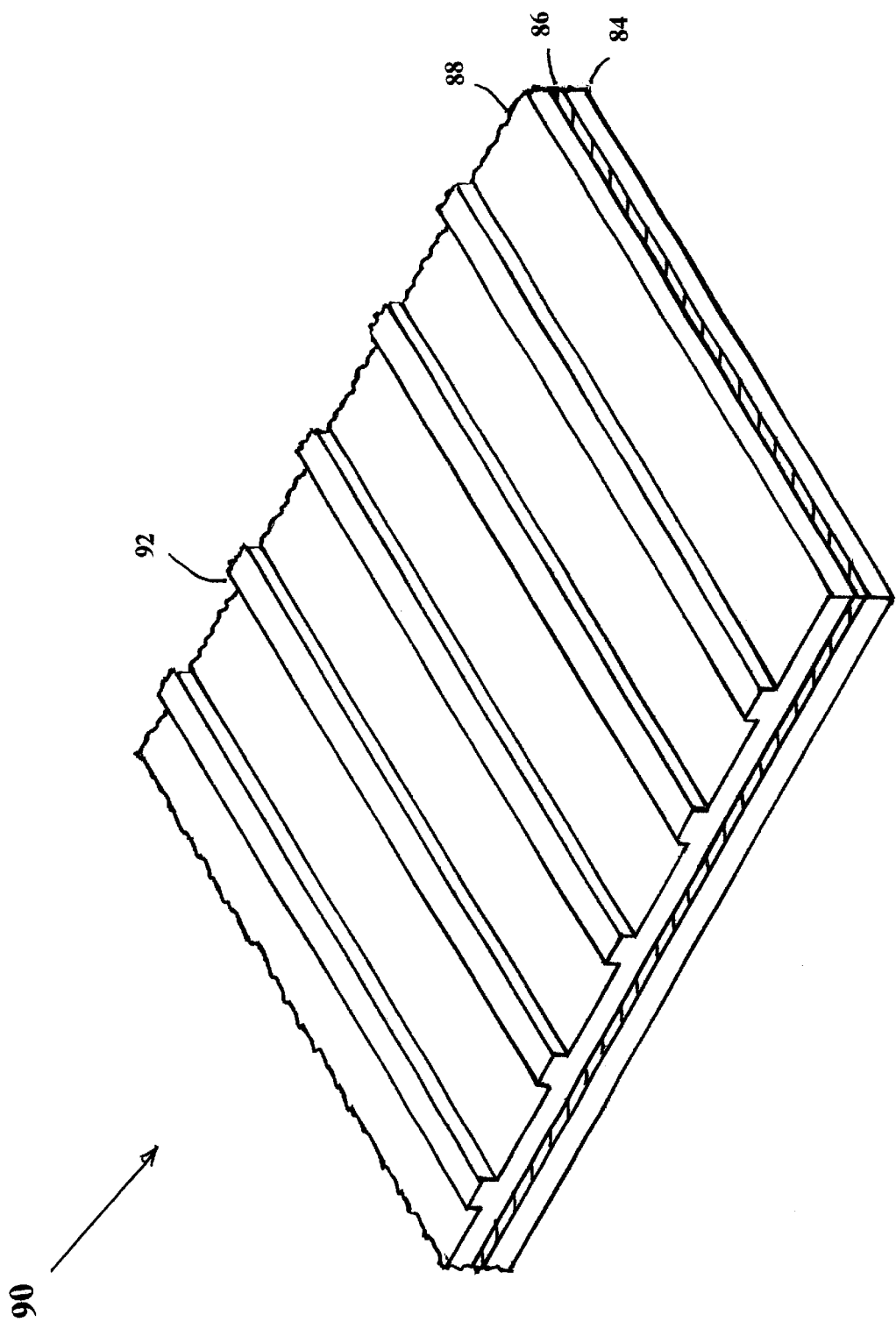
FIG. 6 shows a membrane sandwich having a corrugation on one face.

FIG. 6 is an illustration 90 that illustrates a membrane sandwich 46 showing a first colored film 84, a central conducting film 86 and a second colored film 88. Optional corrugations 92 are illustrated on second surface 88. While corrugations are indicated to be uniform ridges on the surface they could optionally be peaked, rounded and/or include undulations. Corrugations 92 provide the functions of enhancing flexibility in the desired direction of flexure over flexibility in the orthogonal direction. Corrugations 92 also minimize contact between adjacent surfaces, enhancing separability and minimizing surface-to-surface friction. Surface separability and low friction is further enhanced by undulations along corrugations, not shown.

Figure 7:
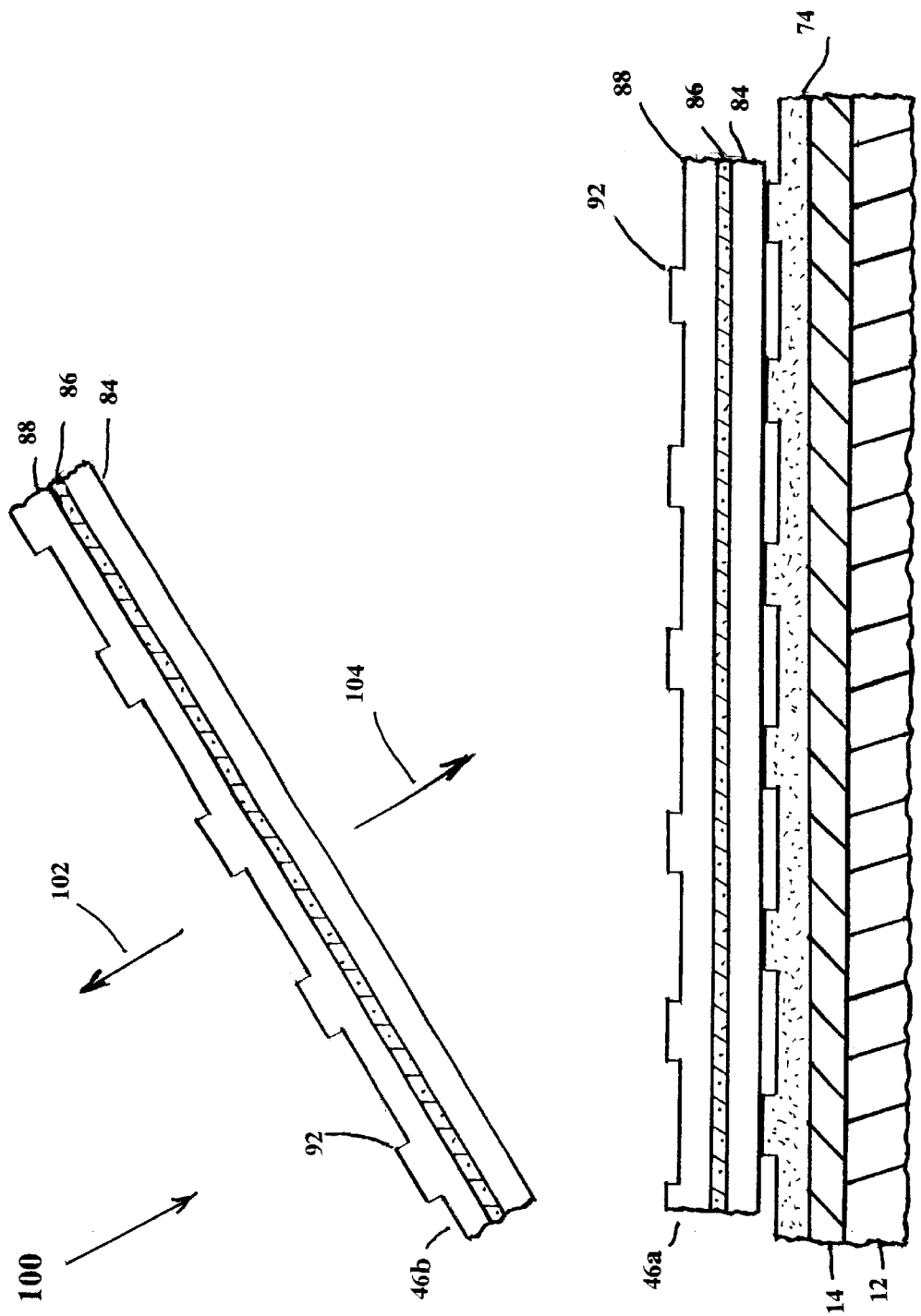
FIG. 7 illustrates forces acting upon a membrane sandwich.

FIG. 7 is an illustration 100 that illustrates forces 102 and 104 on a pair of membranes 46a and 46b. In the illustration membrane 46a is attracted to flat electrode 14 by opposite electric charges. The second membrane 46b of like charge as membrane 46a is not attracted to membrane 46a and is in fact being attracted away from membrane 46a by an electric force 102. Force 104, a combination of electrical attraction and mechanical restoring force of membrane 46a, resists attractive force 102. The preferred stress free condition of membranes 46 is their position as formed wherein they lie flat and parallel to flat electrode 14. Any electrical force 102 will work against combined mechanical/electrical force 104. When the electric field is removed then force 104 restores a membrane 46 to its neutral position nearest the flat electrode 14. Other neutral stress conditions are also accommodated in which case forces acting on a membrane 46 will be a composite of electrical attraction and mechanical moment away from neutral. Analysis shows that the bending induced mechanical moment varies as the third power of membrane thickness, demonstrating the need to keep thickness of membrane(s) 46 to a minimum. Corrugations 92 are comprised of ridges and troughs that run parallel to rounded electrode 26. As a result of corrugations 92 mechanical bending force induced by bending are minimal as membranes are attracted to and wrap around the surface of a rounded electrode 26 but increased in the orthogonal direction. By this means undesired flexures in membranes 46 are minimized.

It is well known that when two smooth surfaces are in intimate contact the force needed to separate them can be quite large. This fact is the basis for the well known optical contact procedure utilized to join two glass surfaces without the use of optical cement. Corrugations 92 minimize this intimate contact effect. Each membrane sandwich 46 posses a flat surface 84 and a corrugated surface 88. Whenever adjacent membrane surfaces are in contact a flat surface 84 is always in contact with a corrugated surface 88 as illustrated in FIG. 7. Corrugations provide the additional function of minimizing surface contact between adjacent membranes 46, thus also serving to minimize sliding friction as a group of membranes flex together.

Optionally corrugations 92 can be fabricated having an undulating top surfaces wherein each corrugation ridge exhibits a series of peaks and valleys, not shown. Only the peaks on the corrugation ridges make contact with an adjacent membrane smooth surface, further minimizing surface-to-surface contact.

Corrugation ridges and troughs are oriented parallel to rounded electrode 26, providing a preferred bend direction wherein membranes 46 wrap preferentially around rounded electrodes 26. Bending in the orthogonal direction is inhibited by the corrugations. Corrugation depth can be modest since mechanical bending moment varies as the third power of membrane thickness. The peaks and valleys on an undulating corrugation top can be quite modest. Only a sufficient difference is required to limit contact between undulation peaks with a smooth surface. The resulting limited surface-to-surface contact provides a significant reduction in surface-to-surface adherence as well as a reduction in sliding friction.

Figure 8:
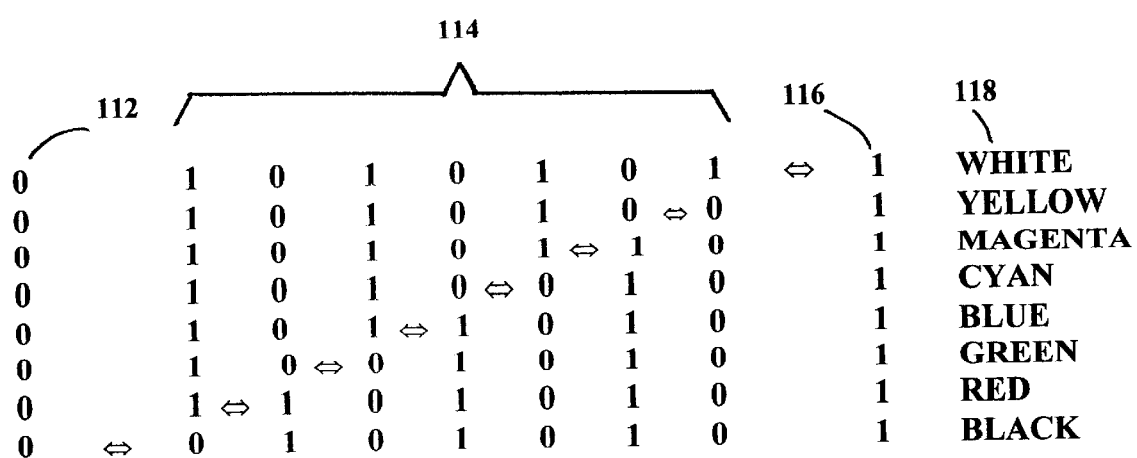
FIG. 8 shows a table of flexible membrane polarities for setting chromatophore color.

Presented in FIG. 8 is a table 110 illustrating voltage polarities 114 of membranes 46 and the adjacent electrodes 26 and 14 between which membrane stacks 22 are juxtapositioned. A first electrical polarity 112 is indicated by the symbol "0" and the second voltage polarity 116 by the symbol "1". One polarity is positive and the other is negative, the exact value being set in a specific design. In one embodiment of the invention eight colors are available for each chromatophore. Namely: White, Cyan, Magenta, Yellow, Red, Green, Blue and Black (WCYMRGBK) 118. These eight colors are the colors of eight commonly colored adjacent surfaces between seven membranes 46 and the two electrodes 26 and 14. The particular eight color set (WCYMRGBK) 118 is a preferred set as these colors enable a full color gamut when local groups of adjacent chromatophores are included in a visually resolvable picture element. The three light colors Cyan, Magenta and Yellow are of particular significance since they enable display of bright highlight colors typical of many natural scenes.

Referring now to the top row in the table of FIG. 8 designated WHITE, voltages 114 of membranes 46 are at alternate polarities between each other and the black electrode at the fixed polarity 0 112. Thus all seven membranes 46 are attracted to each other and to the black electrode. The membrane nearest the white electrode at the fixed voltage polarity 1 116 is attracted away from the white electrode and to the other membranes 46 in membrane stack 22. A white surface is exposed at both the membrane stack and the white electrode and the color White is produced for the chromatophore. In the second row of the table the color Yellow is produced when the polarity of the membrane 46 nearest the white electrode is reversed from polarity 1 to polarity 0. This membrane becomes attracted to the white membrane and separates from the other six membranes 46 that remain attracted to each other and to the black electrode. Exposed surfaces of membranes 46 on either side of the separation are yellow and the chromatophore color is Yellow. In a similar manner each color of the set is developed by control of voltage polarity of membranes 46 in accordance with the table 110 of FIG. 8 whereby surfaces of common color separate. The color Black is produced when all membranes 46 are attracted to each other and away from the black electrode at voltage polarity 0, exposing common black surfaces.

Limited color gamuts are possible for color sets with fewer colors than eight. Thus a color highlight display would be achieved with one color in addition to black and white. Three colors in addition to black and white will produce a limited full color gamut with some hues and chromas unavailable but still useful in many applications.

We turn now to FIGS. 9, 10, 11A, 11B, 11C, 12, and 13 wherein electronics circuitry is presented for driving chromatophore membranes in a ripple fashion whereby membranes are repositioned sequentially. Mechanical moment in a membrane curved away from its neutral position varies as the third power of thickness. If membranes in a stack were to maintain physical contact as they are being re-positioned a far greater electric drive would be needed than if they could be separated and re-positioned sequentially. The circuitry shown in the figures demonstrate the inventive approach to achieve sequential membrane switching between electrodes.

Figure 9:
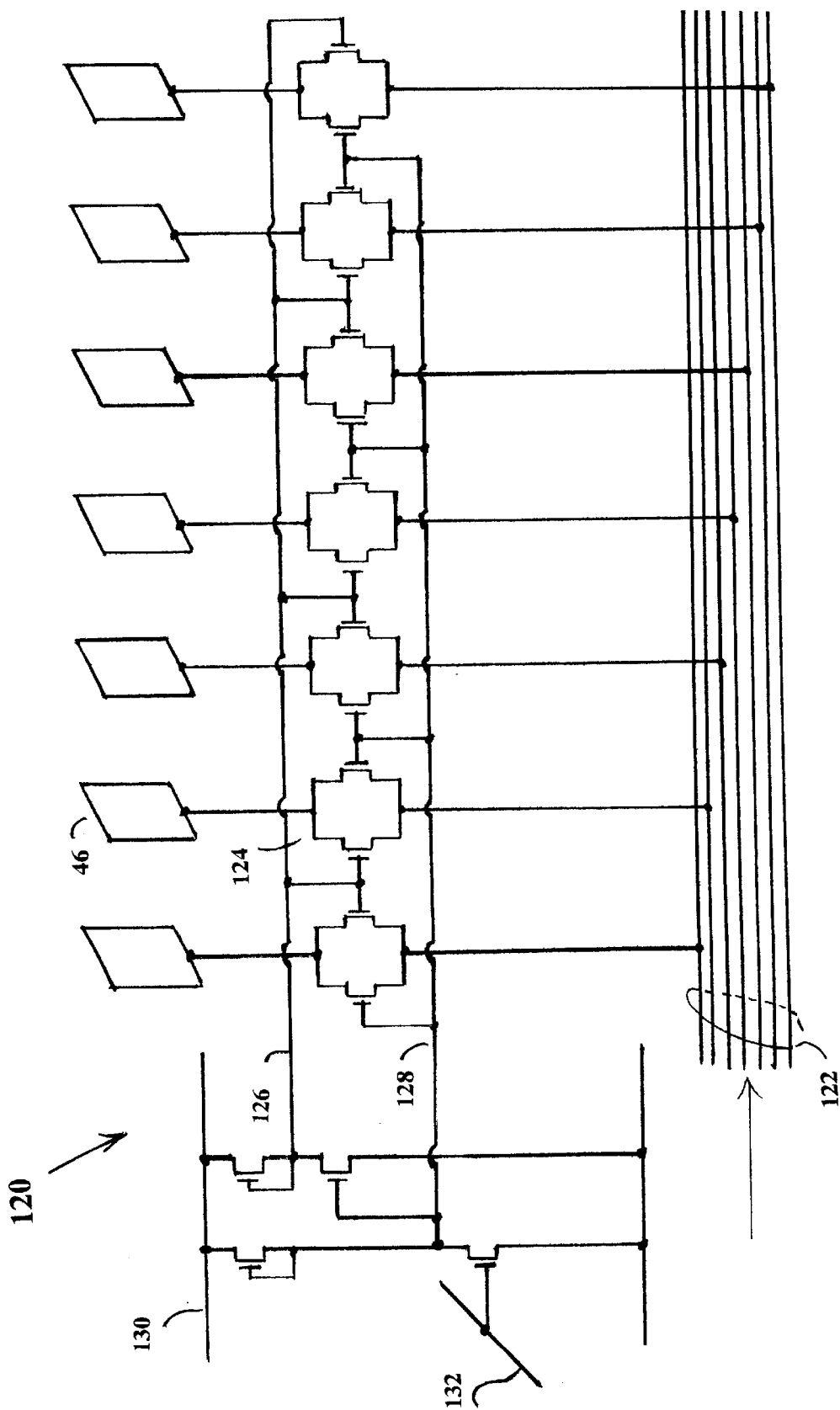
FIG. 9 illustrates raster scanning and signal connections to the plurality of membranes of a chromatophore.

FIG. 9 illustrates raster-scanning 120 whereby signals supplied by data bus 122 are connected to membranes 46. Signal supplied to a membrane 46 is tri-state in that the signal can be of either polarity or the membrane can float electrically. A plurality of two-transistor CMOS transmission gates 124 connect signal from the data bus 122 to membranes 46 allowing voltage of either polarity to be connected when the gates are activated and allowing membranes to float when gates 124 are inactive. Gates 124 are activated by scan signals 126 and 128 from bi-polar signal derived from row select line 130 and column select line 132. A sequence of row select and column select signals provide the raster scan that is common in television or computer displays. As illustrated in FIG. 9 a dual transistor transmission gate 124 is utilized for connection of signal to each membrane 46 in a chromatophore and provides connectivity for voltage of either polarity. The pattern of voltage polarities supplied to membranes 46 result in one pair of adjacent membrane surfaces being presented to view, the common color of which comprises the color displayed by a given chromatophore.

Signal is supplied to data bus 122 by a chain of CMOS inverters. Signal delay along the chain is utilized to achieve sequential driving of the plurality of membranes 46 of a chromatophore 38.

FIG. 10 describes transients 140 along a chain 150 of CMOS inverters 152 as an example. Initially nodes a and c are at negative polarity while nodes b and d are positive. If node a is switched quickly from negative to positive then current will begin to flow in the connected inverter 152a. Node b will change polarity, but only as current flows into capacitance Ca. After a short time interval the voltage at node b will have changed sufficiently to activate inverter 152b, causing current to flow into capacitance Cb, which after another short time interval will activate inverter 152c. By similar trains of events each successively connected inverter 152 in CMOS chain 150 will be activated following a short time interval. By the means described those membranes 46 connected to inverters 152 will be repositioned in a ripple fashion as a transient propagates along the CMOS chain 150 of inverters 152.

Figure 11C:
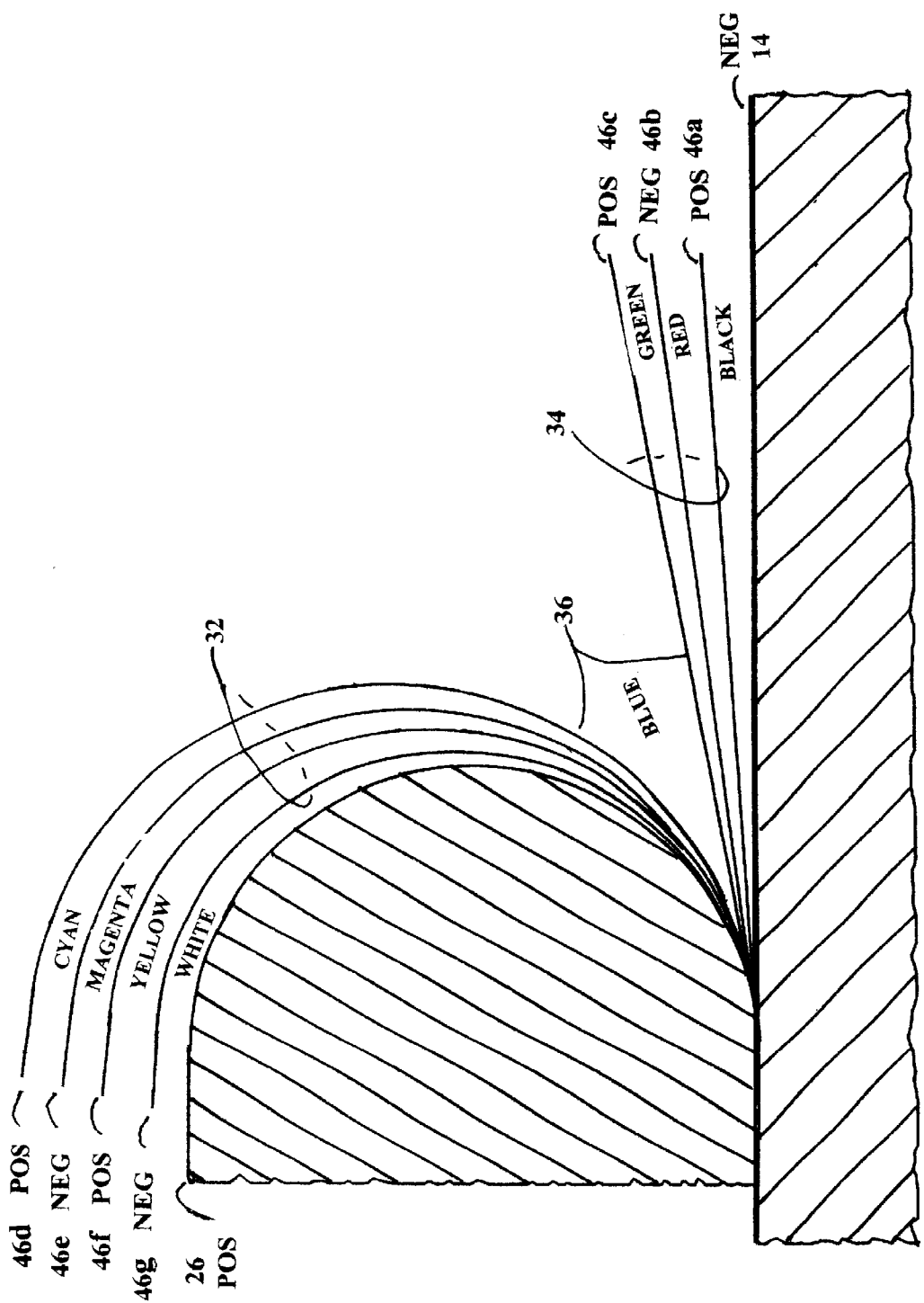
FIG. 11C presents a sketch of chromatophore membranes driven by the pair of sub chains and separated such as to display a given color.

FIGS. 11A and 11B show two configurations 160 of a data bus driver chain 150 comprised of a chain of CMOS inverters 152 and reversing switches 154. By means of reversing switches 154 the inverter input nodes 156 can be connected to the output 158 on the right or the output 160 on the left, right and left being referenced to the drawing of FIGS. 11A and 11B. Setting of switch 154 positions is the means by which color signal is transmitted to membranes 46 over data bus 122. As switch settings are changed chromatophore color is changed accordingly. FIG. 11C illustrates positions of membranes 46 that correlate with the setting of switches 154 in FIG. 11A.

With switches set as shown in the example of FIG. 11A membranes 46a, 46b and 46c are coadunate with black flat electrode 14 while membranes 46d, 46e, 46f, and 46g are coadunate with rounded electrode 26, as illustrated in FIG. 11C. In conformity with the color designations of FIG. 8 the color blue will be displayed by the chromatophore.

FIG. 11B shows the chain of inverters 152 in the example wherein switches 154d and 154e have been reset. After transients have settled, the chromatophore color will be magenta according to FIG. 8. Whereas in FIG. 11A inverters 152d and 152e had had their input nodes 156 connected to the output of the inverter immediately to the left, after switch resetting their input nodes are connected to the inverter immediately to the right as shown in FIG. 11B. The transient on inverter 152e will settle first as its input node 156e is newly connected to the stable output node 160f of inverter 152f. The transient on inverter 152d will not begin until the transient on inverter 152e is well under way. During the interim membrane 46e will detach from its adjacent membrane 46d under the newly established electric attraction to membranes on its right. After the transient on inverter 152e has further advanced inverter 152d will begin to change polarity, causing membrane 46d to change position. By means of the inherent time in the propagation of transients along the chain of inverters 150 membranes 46 that are being repositioned for the display of a different color will detach separately and move separately beginning at the initial point of partition of membranes 46 in stack 22 and ending at the final point of partition. As a result of this individual motion, forces that are needed to reposition membranes will be reduced compared to those forces needed if several membranes 46 were to be repositioned as a group.

FIG. 11C illustrate positions of membranes 46 for the signal condition of FIG. 11A wherein the chromatophore will show magenta as defined by FIG. 8. Following repositioning of membranes 46e and 46d according to switch changes between FIGS. 11A and 11B the chromatophore will show blue. Switch 154 settings along CMOS inverter 150 chain are the determinant of color of a chromatophore.

Figure 12:
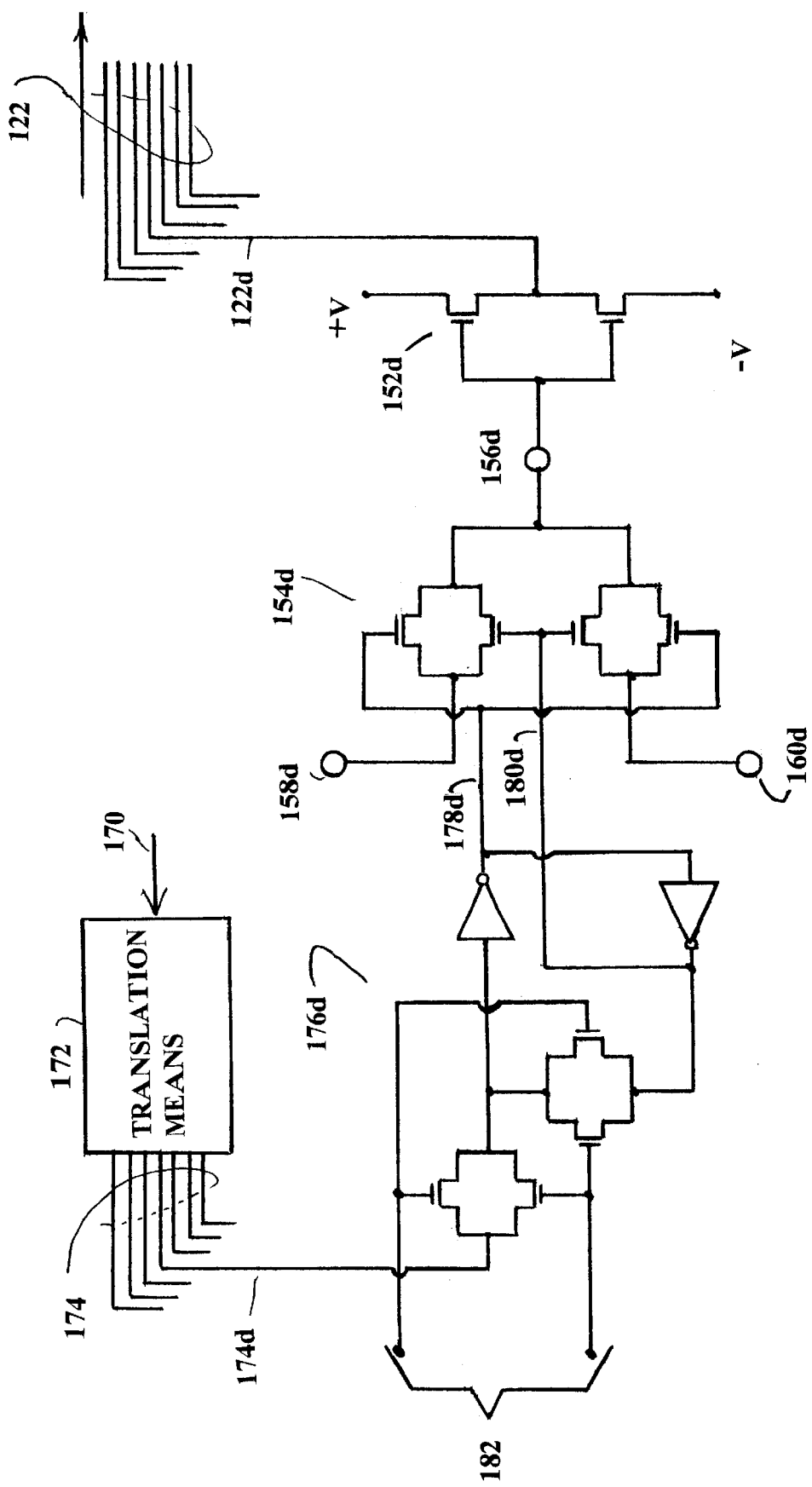
FIG. 12 is an illustration of details of a reversing switch driven by color signal.

FIG. 12 illustrates circuitry whereby color signals are supplied to data bus 122. Input signal on bus 170 is utilized to set switches 154 and hence the color displayed by a selected chromatophore. Input color signal for a chromatophore is presented as voltage polarities on bus 170. A translation means 172 translates polarities of signal bus 170 into voltage levels on the multiple lines of switch control bus 174, there being one signal line for each switch 154 in the CMOS chain of inverters 150. In FIG. 12 the operation for a single switch 154d is illustrated. As determined by a bipolar timing clock signal 182 the signal on bus line 174d is latched by latch 176d providing complimentary signals 178d and 180d to activate switch 154d. The setting of switch 154d then connects either node 158d or node 160d to input node 156d as input for inverter 152d. Voltage output from inverter 152d is supplied to bus line 122d and from bus 122 to the chromatophore selected by row and column scan lines 130 and 132. Voltage on corresponding bus line 122d is saturated at either polarity, +V or −V.

All switches 154 along CMOS inverter chain 150 are set by similar means. As switches are reset from previous settings voltage polarities supplied to membranes 46 of the selected chromatophore are reestablished, thereby determining a new value of displayed color of the chromatophore. Signals from the CMOS chain 150 of inverters 152 are supplied to data bus 122 and then supplied to individual chromatophores by the raster scan as described in conjunction with FIG. 9.

Figure 13:
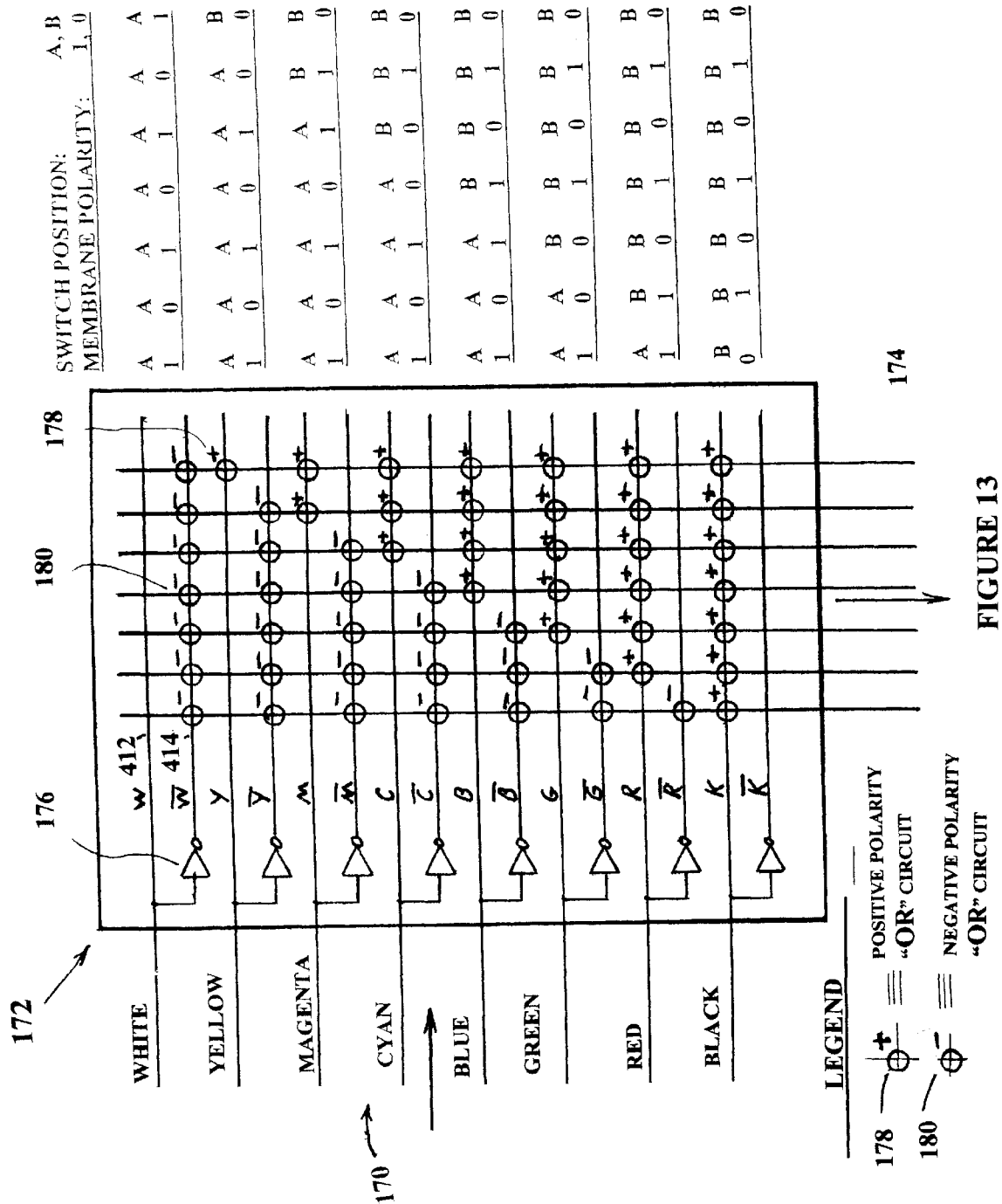
FIG. 13 presents an electronic matrix for converting chromatophore color specification to chromatophore control signal.

FIG. 13 illustrates logic for translation means 172 wherein a given color for a chromatophore specified as a voltage polarity on one of a number of input leads 170 is translated to voltage levels on each of the several leads of switch control bus 174 that determines membrane position and hence chromatophore color. Only a single lead in input bus 170 will exhibit a voltage level at any pixel time and that specific lead specifies the setting of membranes 46 of a selected chromatophore. Within translation means 172 both the signals and compliments are made available with the help of circuits 176. From these complimentary voltages the signal voltages required on each lead in bus 174 are derived by means of a matrix of logical OR circuits 178. As indicated in the table attached to FIG. 13 positions of switches 154 are set to either an A or a B position there being a unique setting of switches 154 for each color. Corresponding membrane polarities are indicated as either 1 or 0 and correlate with the polarities shown in FIG. 8.

In those cases where adjacent membrane polarities are opposite, corresponding membranes are attracted to each other and become coadunate with either electrode 14 or electrode 26. In each row of the table accompanying FIG. 13 only one adjacent pair of membranes 46 are of common polarity, indicated by adjacent 1s or adjacent 0s. This is the pair that separates to reveal their common color for display.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A display mechanism capable of showing two or more colors using one or more colored flexible membranes that electrostatically switch between stationary electrodes of different geometries wherein stationary electrodes of one geometry are substantially flat, parallel to and integral with a substrate containing electronic circuitry and, stationary electrodes of a second geometry are substantially rounded three dimensionally and wherein said stationary electrodes are coadunately located at the binding base of, but on the opposed surfaces of, the same display membrane(s) wherein they form an angle with said membrane(s).

2. The display mechanism of claim 1 further comprising electronic means whereby said membranes are driven to electric potentials whereby said membranes separate revealing chromatophore colors that comprise a displayed image according to an electronic input.

3. The display mechanism of claim 2 comprising an array of at least one chromatophore element wherein each said chromatophore element is comprised of at least one stack of colored electrically charged membrane juxtapositioned between a colored electrically charged first electrode and a colored electrically charged second electrode and, wherein surfaces of said membranes and electrodes become parted into a first portion and a second portion when membranes of said first portion are attracted to each other and to said first electrode as the result of opposite electric charges and membranes of said second portion are attracted to one another and to said second electrode as a result of opposite electric charges whereby membranes of said first portion becomes approximately coadunate with said first electrode and membranes of said second portion becomes at least approximately coadunate with said second electrode and, wherein facing adjacent surfaces of said first and said second portions are not mutually attracted as a result of similar electric charge on said facing adjacent surfaces and, wherein only one pair of said adjacent surfaces are of the same voltage polarity and hence part and, wherein said facing adjacent surfaces thusly parted are of similar color and are at least partially visible to view and comprise the color of the chromatophore.

4. The display mechanism of claim 3 wherein each membrane of said membrane stacks is comprised of at least a conductor having a first surface of a first given color and an opposing surface of a second given color and wherein at least one membrane surface is covered with an insulation means to prevent electrical conductivity between surfaces and wherein said similar colors of adjacent surfaces are chosen from a color set of at least: white, cyan, magenta, yellow, red, green, blue and black.

5. The display device of claim 4 wherein each membrane of said stacks of membranes is comprised of a conducting layer sandwiched between a first colored dielectric film and a second colored dielectric film wherein said first colored dielectric film, said central conductor, and said second colored dielectric film are permanently laminated to each other and wherein a minimal level of adherence exists between outer surfaces of a said laminated membrane sandwich and other surfaces with which it may come in contact.

6. The display mechanism of claim 1 wherein at least one face of the flexible membrane(s) possesses a surface corrugation comprised of a plurality of peaks and troughs that extend parallel to the axis of the desired flexure whereby membrane flexure is enhanced in the desired direction and inhibited in the orthogonal direction and whereby surface-to-surface contact area and adhesion between adjacent surfaces is minimal.

7. The display device of claim 6 wherein said corrugation peaks possess undulations along their ridgelines wherein contact with an adjacent flat surface is limited to contact of said flat surface with undulation maxima.

8. The display mechanism of claim 2 wherein said electronic means is comprised of at least one patch of thin film semiconductor-on-insulator-on-substrate and connectivity means between said electronic means and said membranes.

9. Electronic means to supply driving signal to a plurality of flexible membrane chromatophores whereby they part as they are driven electrically wherein they switch between first and second electrodes of different geometries whereby they reveal chromatophore color.

10. The electronics means of claim 9 comprised of switching circuit means by which membranes of a selected stack of membranes are connected to a signal supply bus and wherein said switching circuits are tri-level wherein a voltage of either polarity can be connected to said membranes or the membranes can be disconnected wherein a voltage on a membrane will persist as a result of electronic charge stored on circuit capacitances and, wherein said switching circuit means is further comprised of electronic means whereby only those chromatophores that are to be modified are selected.

11. The electronic means of claim 9 further comprised of circuit means to provide signal to a signal supply bus in a ripple fashion whereby each membrane of a scan-selected chromatophore that needs to switch locations is sequentially switched between electrodes beginning at the current location of membrane parting and proceeding to the new location of membrane parting.

12. The electronic means of claim 11 wherein said bus supply circuit means comprises a plurality of drive circuits in a chain whereby said plurality of drive circuits are driven in sequence by a signal from an adjacent circuit along said chain and wherein electronic delay along said chain is utilized to position said membranes of said selected stack sequentially.

13. The electronics means of claim 12 wherein said chain of circuits is further comprised of electronic switches between adjacent circuits whereby said circuit chain can be partitioned into a first sub-chain and a second sub-chain and wherein said membranes are partitioned into a first portion driven by said first sub chain and a second portion driven by said second sub chain and said membrane portions are parted to reveal chromatophore color at the point of partition of said chain and, whereby signal propagated along said sub-chains propagates in a direction away from an initial point of parting toward a final point of parting whereby membranes that are being switched electrically are switched sequentially beginning at the current location of membrane parting and proceeding to the new location of membrane parting and wherein membranes driven by said first sub-chain are supplied with voltage polarities wherein they become attracted to each other and to said first electrode and wherein membranes driven by said second sub-chain are supplied with voltage polarities wherein they become attracted to each other and to said second electrode and wherein membranes adjacent to the point of parting are supplied with like polarity whereby they re not attracted to each other and, whereby the setting of said electronic switches determine the location where said membranes of a said stack of membranes part into said first portion and said second portion whereby chromatophore color is displayed.

14. The electronics of claim 13 further comprising means to translate received image signal into voltage signals matched to the chromatophore display requirements and to the image position of picture elements wherein color specification is received as voltage polarities on a plurality of lines wherein all said lines except one given line are of common polarity and said given line is of opposite polarity whereby chromatophore color is specified and, further comprised of an electronic matrix whereby voltage polarities on said plurality of lines establish signals whereby said circuit chain is partitioned into said first sub-chain and said second sub-chain whereby chromatophore color is established.

15. The display device of claim 9 wherein said electronics means is comprised of solid-state electronics wherein the electronics medium is chosen from a set that includes at least: silicon, germanium, gallium-arsenide and organic semiconductor materials and their combinations.

16. The electronic means of claim 14 wherein as signal propagates along said sub chains from an initial location of membrane parting and proceeding to a new location of parting only membranes lying between said initial and said new parting locations are actively driven by signal as electric charge on circuit capacitances is reversed by drive current and, wherein other membranes do not switch physical position as result of voltages on said other membranes remaining approximately unchanged.

* * * * *